United States Patent
Margraf et al.

(10) Patent No.: US 8,630,551 B2
(45) Date of Patent: Jan. 14, 2014

(54) METHOD AND SYSTEM FOR CHARACTERIZING AN OPTICAL DEVICE

(75) Inventors: Michael Margraf, Berlin (DE); Christoph Clemens Leonhardt, Berlin (DE); Andreas Matiss, Berlin (DE)

(73) Assignee: u2t Photonics AG, Berlin (DE)

( * ) Notice: Subject to any disclaimer, the term of this patent is extended or adjusted under 35 U.S.C. 154(b) by 268 days.

(21) Appl. No.: 13/181,422

(22) Filed: Jul. 12, 2011

(65) Prior Publication Data

US 2012/0020669 A1 Jan. 26, 2012

(30) Foreign Application Priority Data

Jul. 20, 2010 (EP) .................................. 10007490

(51) Int. Cl.
*H04B 10/06* (2011.01)
*H04B 10/64* (2013.01)

(52) U.S. Cl.
CPC .................................... *H04B 10/64* (2013.01)
USPC ........................................ 398/204; 398/208

(58) Field of Classification Search
USPC ...................... 398/9, 202–204, 208
See application file for complete search history.

(56) References Cited

U.S. PATENT DOCUMENTS

| | | | |
|---|---|---|---|
| 6,507,012 B1 | 1/2003 | Medard et al. | |
| 8,165,476 B2 * | 4/2012 | Fujii | 398/198 |
| 8,340,533 B2 * | 12/2012 | Mandai et al. | 398/208 |
| 8,406,621 B2 * | 3/2013 | Painchaud et al. | 398/25 |
| 2004/0145381 A1 | 7/2004 | Su et al. | |
| 2004/0151503 A1 * | 8/2004 | Kashima et al. | 398/115 |

(Continued)

FOREIGN PATENT DOCUMENTS

JP 2009-192746 8/2009

OTHER PUBLICATIONS

R. Kunkel et al., "Athernal InP-Based 90°-Hybrid Rx OEICs with Pin-PDs>60 GHz for Coherent DP-QPSK Photoreceivers" IPRM 2010, 22nd International Conference on Indium Phosphide and Related Materials, May 31-Jun. 4, 2010, 4 pages.

R. Kunkel et al., "First Monolithic InP-Based 90°-Hybrid OEIC Comprising Balanced Detectors for 100GE Coherent Frontends", IEEE International Conference on Indium Phosphide & Related Materials, 2009, XP-002614631, 167-170 pages.

(Continued)

*Primary Examiner* — Dalzid Singh
(74) *Attorney, Agent, or Firm* — Foley & Lardner LLP

(57) ABSTRACT

An embodiment of the invention relates to a system comprising an optical device (10) and an evaluation device (20) for characterizing the optical device. The optical device comprising a 90° optical hybrid unit (30) having a first and second optical input (30E1, 30E2) and at least two optical outputs (30A1-30A4) wherein optical output signals (So1-So4) leaving the optical outputs have optical phase differences between each other of 90° or multiple thereof; a first photodetector (P1) connected to a first optical output (30A1) and a second photodetector (P2) connected to a second optical output (30A2), wherein the first optical output emits a first optical output signal (So1) and the second optical output emits a second optical output signal (So2), said second optical output signal having an optical phase difference of 180° relative to the first optical output signal; and a first transimpedance amplifier (Tr1) connected to the first and second photodetectors (P1, P2). The evaluation device (20) is characterized by a signal source (110) configured to generate a first and second intensity-modulated optical input signal (Sin1, Sin2); an optical phase shifter (120) adapted to phase-shift the optical phase of the second intensity-modulated optical input signal relative to the optical phase of the first intensity-modulated optical input signal; a measurement unit (160) adapted to measure the electrical output signal of the first transimpedance amplifier (Tr1); and a control unit (130) adapted to control the optical phase shifter.

5 Claims, 2 Drawing Sheets

(56) References Cited

U.S. PATENT DOCUMENTS

| | | |
|---|---|---|
| 2007/0041021 A1 | 2/2007 | Dorrer |
| 2007/0110362 A1 | 5/2007 | Shpantzer et al. |
| 2010/0166427 A1 | 7/2010 | Jeong |
| 2011/0305464 A1* | 12/2011 | Goldfarb .................. 398/208 |
| 2012/0106984 A1* | 5/2012 | Jones et al. .................. 398/214 |
| 2012/0251031 A1* | 10/2012 | Suarez et al. .................. 385/3 |

OTHER PUBLICATIONS

R. Ludwig et al., "Coherent Detection of a 50 Gb/s QPSK Signal Using an InP 90° Hybrid Monolithically Integrated with Balanced Photodetectors", 35th European conference on Optical Communication (ECOC), XP-002614630, Sep. 20-24, 2009, 2 pages.

Yves Painchaud et al., "Performance of balanced detection in a coherent receiver", Optics Express, vol. 17, No. 5, Mar. 2, 2009, 3659-3672 pages.

* cited by examiner

METHOD AND SYSTEM FOR CHARACTERIZING AN OPTICAL DEVICE

The invention relates to a method and a system for characterizing an optical device.

BACKGROUND OF THE INVENTION

Publication "Athermal InP-Based 90°-Hybrid Rx OEICs with pin-PDs >60 Ghz for Coherent DP-QPSK Photoreceivers" (R. Kunkel, H.-G. Bach, D. Hoffmann, G. G. Mekonnen, R. Zhang, D. Schmidt and M. Schell, IPRM 2010, 22nd International Conference on Indium Phosphide and Related Materials, May 31-Jun. 4, 2010, Takamatsu Symbol Tower, Kagawa, Japan) discloses an optical device having a 90° optical hybrid unit, photodetectors, and transimpedance amplifiers.

OBJECTIVE OF THE PRESENT INVENTION

An objective of the present invention is to provide a method which allows characterizing an optical device having a 90° optical hybrid unit, at least two photodetectors, and a transimpedance amplifier.

A further objective of the present invention is to provide a method which allows measuring the amplitude and phase response of an optical device having a 90° optical hybrid unit, at least two photodetectors, and a transimpedance amplifier, for specific intensity-modulation frequencies.

A further objective of the present invention is to provide a system for characterizing an optical device having a 90° optical hybrid unit, at least two photodetectors, and a transimpedance amplifier for a specific intensity-modulation frequency.

BRIEF SUMMARY OF THE INVENTION

An embodiment of the present invention relates to a method for characterizing an optical device, which comprises: a 90° optical hybrid unit having a first and a second optical input and at least two optical outputs wherein signals leaving the optical outputs have optical phase differences between each other of 90° or multiple thereof; a first photodetector connected to a first optical output and a second photodetector connected to a second optical output, wherein the first optical output emits a first optical output signal and the second output emits a second optical output signal, said second optical output signal having an optical phase difference of 180° relative to the first optical output signal; and a first transimpedance amplifier connected to the first and second optical outputs of the 90° optical hybrid unit. A first intensity-modulated optical input signal and a second intensity-modulated optical input signal are generated. The first intensity-modulated optical input signal is inputted into the first optical input and the second intensity-modulated optical input signal is inputted into the second optical input. The optical phase of the second intensity-modulated optical input signal is phase-shifted relative to the first intensity-modulated optical input signal, and the electrical output signal of the first transimpedance amplifier is used to characterize the optical device.

In a preferred embodiment, the optical device comprises a third photodetector connected to a third optical output of the 90° optical hybrid unit, and a fourth photodetector connected to a fourth optical output of the 90° optical hybrid unit, the third optical output emitting a third optical output signal and the fourth optical output emitting a fourth optical output signal, said fourth optical output signal having an optical phase difference of 180° relative to the third optical output signal. The electrical output signals of the third and fourth photodetector may be low-pass filtered and the low-pass filtered signals may be inputted into an operational amplifier. The output signal of the operational amplifier may be used to control a phase-shifter which controls the optical phase-difference between the first and second intensity-modulated optical input signals in order to provide that the low-pass filtered signals have the same amplitude.

Preferably an optical reference signal is intensity-modulated at an intensity-modulation frequency. The intensity-modulated optical reference signal may be inputted into a 3 dB-splitter which generates the first and second intensity-modulated optical input signals for the 90° optical hybrid unit.

According to a preferred embodiment, the intensity-modulation frequency is higher than the bandwidth of the low-pass filtered signals.

In order to characterize the amplitude response of the optical device, a ratio between the amplitude of the electrical output signal of the first transimpedance amplifier and the amplitude of the intensity-modulation of the optical reference signal, or a signal proportional thereto, may be determined for the intensity-modulation frequency, said ratio characterizing the amplitude response of the optical device for the intensity-modulation frequency with respect to the first optical output.

In order to characterize the phase response of the optical device, a phase difference value, which indicates the phase difference between the phase of the electrical output signal of the first transimpedance amplifier and the phase of the intensity-modulation of the optical reference signal, or a signal proportional thereto, may be determined for the intensity-modulation frequency, said phase difference value characterizing the phase shift of the optical device for the intensity-modulation frequency with respect to the first optical output.

After determining said ratio and/or said phase difference value, the optical phase difference between the first and second intensity-modulated optical input signals may be changed by 180° and may be then further controlled such that the low-pass filtered signals have the same amplitude. A second ratio between the amplitude of the electrical output signal of the first transimpedance amplifier and the amplitude of the intensity-modulation of the optical reference signal, or a signal proportional thereto, may be determined for the intensity-modulation frequency, said second ratio characterizing the amplitude response of the optical device for the intensity-modulation frequency with respect to the second optical output.

Additionally or alternatively, a second phase difference value between the phase of the electrical output signal of the first transimpedance amplifier and the phase of the intensity-modulation of the optical reference signal, or a signal proportional thereto, may be determined for the intensity-modulation frequency, said second phase difference value characterizing the phase shift of the optical device for the intensity-modulation frequency with respect to the second optical output.

A further embodiment of the invention relates to a system comprising an optical device and an evaluation device for characterizing the optical device, said optical device comprising: a 90° optical hybrid unit having a first and second optical input and at least two optical outputs wherein optical signals leaving the optical outputs have optical phase differences between each other of 90° or multiple thereof; a first photodetector connected to a first optical output and a second photodetector connected to a second optical output, wherein the first optical output emits a first optical output signal and the second optical output emits a second optical output signal, said second optical output signal having an optical phase difference of 180° relative to the first optical output signal; and a first transimpedance amplifier connected to the first and second photodetectors. The evaluation device is characterized by a signal source configured to generate a first and second intensity-modulated optical input signal; an optical phase shifter adapted to phase-shift the optical phase of the second intensity-modulated optical input signal relative to the optical phase of the first intensity-modulated optical input signal; a measurement unit adapted to measure the electrical output signal of the first transimpedance amplifier; and a control unit adapted to control the optical phase shifter.

According to a preferred embodiment, the optical device further comprises a third photodetector connected to a third optical output of the 90° optical hybrid unit, and a fourth photodetector connected to a fourth optical output of the 90° optical hybrid unit, the third optical output emitting a third optical output signal and the fourth output emitting a fourth optical output signal, said fourth optical output signal having an optical phase difference of 180° relative to the third optical output signal. The control unit may comprise low-pass filters adapted to low-pass filter the electrical output signals of the third and fourth photodetectors and to provide low-pass filtered signals. The control unit may further comprise an operational amplifier to which said low-pass filtered signals are coupled, said operational amplifier being adapted to control the optical phase of the phase-shifter in order to provide that said low-pass filtered signals have the same amplitude.

BRIEF DESCRIPTION OF THE DRAWINGS

In order that the manner in which the above-recited and other advantages of the invention are obtained will be readily understood, a more particular description of the invention briefly described above will be rendered by reference to specific embodiments thereof which are illustrated in the appended drawings. Understanding that these drawings depict only typical embodiments of the invention and are therefore not to be considered to be limiting of its scope, the invention will be described and explained with additional specificity and detail by the use of the accompanying drawings in which.

DETAILED DESCRIPTION OF THE PREFERRED EMBODIMENT

The preferred embodiment of the present invention will be best understood by reference to the drawings, wherein identical or comparable parts are designated by the same reference signs throughout.

It will be readily understood that the present invention, as generally described and illustrated in the figures herein, could vary in a wide range. Thus, the following more detailed description of the exemplary embodiments of the present invention, as represented in FIGS. 1-2, is not intended to limit the scope of the invention, as claimed, but is merely representative of presently preferred embodiments of the invention.

Figure 1:
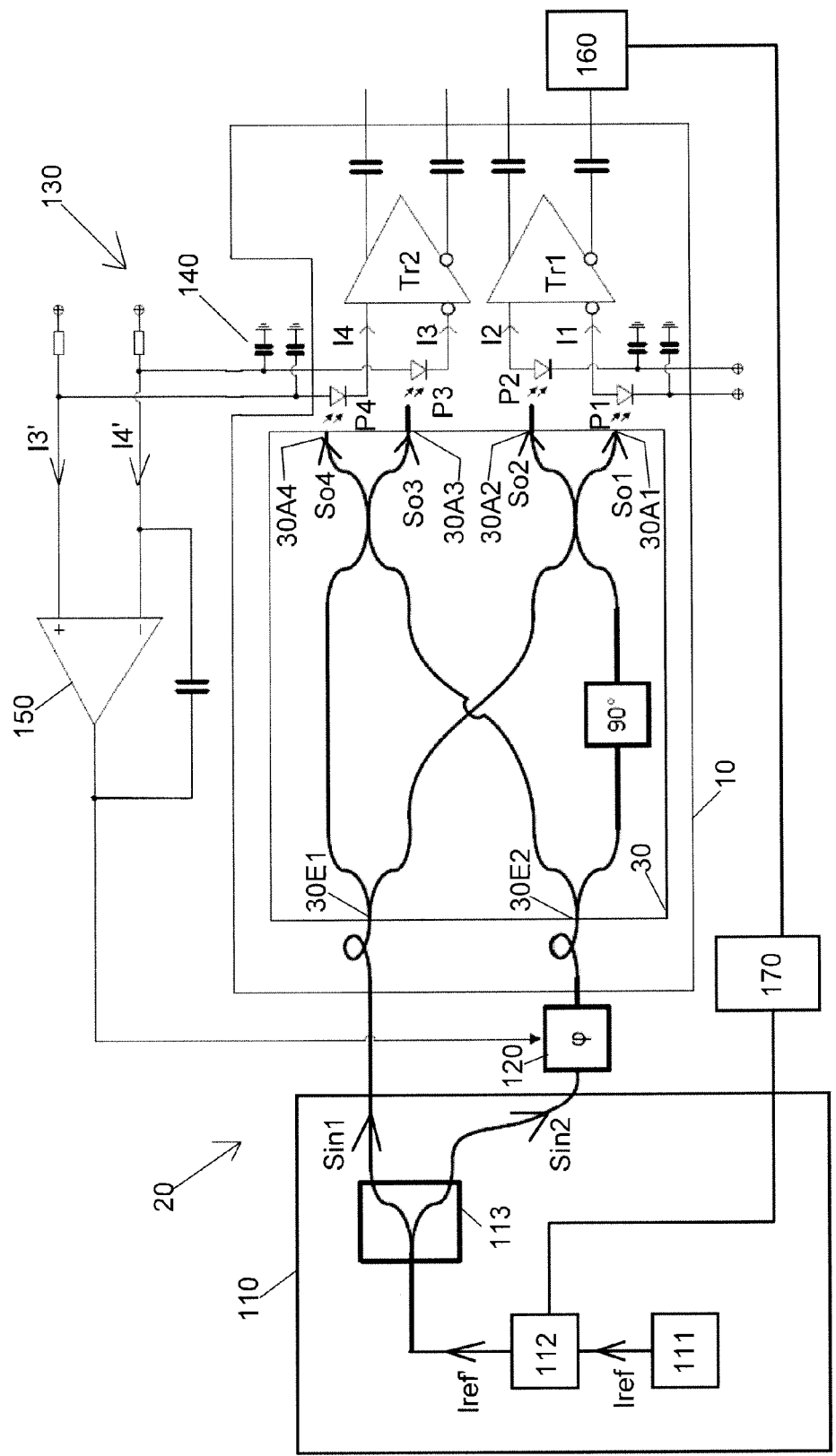
FIG. 1 shows a first exemplary embodiment of an inventive system.
Figure 2:
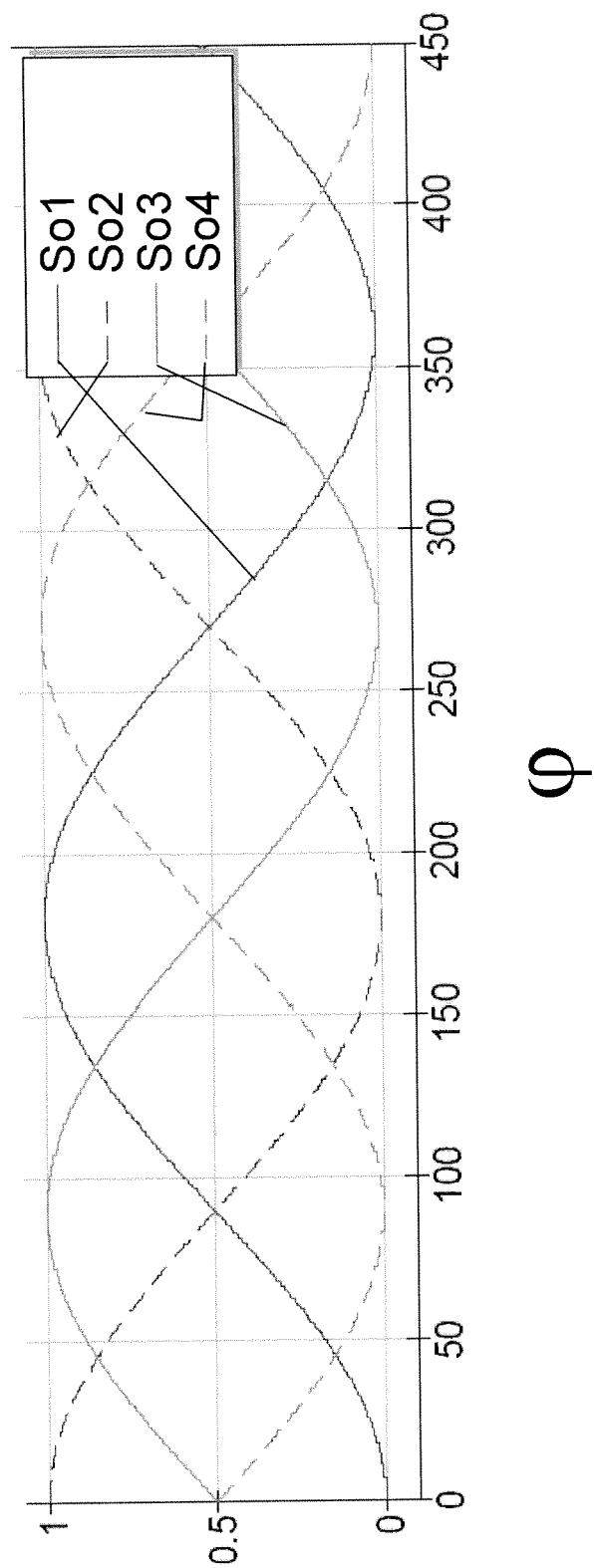
FIG. 2 shows the intensity of optical output signals versus an optical phase difference.

FIG. 1 shows an exemplary embodiment of a system comprising an optical device 10 and an evaluation device 20 which is configured to characterize the optical device 10.

The optical device 10 comprises a 90° optical hybrid unit 30 having a first optical input 30E1 and second optical input 30E2 and four optical outputs 30A1-30A4. The optical output signals So1-So4 which leave the optical outputs 30A1-30A4 have optical phase differences between each other of 90° or multiple thereof.

The optical device 10 further comprises a first photodetector P1, which is connected to the first optical output 30A1, and a second photodetector P2, which is connected to the second optical output 30A2. The first optical output 30A1 emits the first optical output signal So1 and the second optical output 30A2 emits the second optical output signal So2, the second optical output signal So2 having an optical phase difference of 180° relative to the first optical output signal So1. A first transimpedance amplifier Tr1 of the optical device 10 is connected to the first and second photodetectors P1 and P2.

A third photodetector P3 of the optical device 10 is connected to the third optical output 30A3 of the 90° optical hybrid unit, and a fourth photodetector P4 is connected to a fourth optical output 30A4 of the 90° optical hybrid unit. The third optical output 30A3 emits the third optical output signal So3 and the fourth optical output 30A4 emits the fourth optical output signal So4, said fourth optical output signal So4 having an optical phase difference of 180° relative to the third optical output signal So3.

The evaluation device 20 includes a signal source 110 configured to generate a first intensity-modulated optical input signal Sin1 and a second intensity-modulated optical input signal Sin2. As can be seen in FIG. 1, the signal source 110 comprises a laser 111, an intensity modulator 112 and a 3 dB-splitter 113.

The evaluation device 20 further includes an optical phase shifter 120 which can phase-shift the optical phase of the second intensity-modulated optical input signal Sin2 relative to the optical phase of the first intensity-modulated optical input signal Sin1.

A control unit 130 of the evaluation device 20 controls the optical phase shifter 120. The control unit 130 comprises low-pass filters 140 adapted to low-pass filter the electrical output signals I3 and I4 of the third and fourth photodetectors P3 and P4, and to provide low-pass filtered signals I3' and I4'. The frequency limit (cut-off-frequency) of the low-pass filter ranges preferably between 100 Hz and 10 kHz.

The control unit 130 further comprises an operational amplifier 150 to which the low-pass filtered signals I3' and I4' are coupled. The operational amplifier 150 controls the optical phase difference $\phi$ of the phase-shifter 120 and thus provides that the low-pass filtered signals I3' and I4' have the same amplitude.

The evaluation device 20 further includes a measurement unit 160 which measures the electrical output signal(s) of the first transimpedance amplifier TR1. The measurement unit 160 is connected to a central unit 170 of the evaluation device 20. The central unit 170 evaluates the signals provided by the measurement unit 160 and controls the signal source 110.

The system shown in FIG. 1 may operate as follows:

The signal source 110 generates an optical reference signal Iref which is intensity-modulated at an intensity-modulation frequency by intensity modulator 112. The intensity modulated reference signal Iref' is inputted into 3 dB-splitter 113 which generates the first intensity-modulated optical input signal Sin1 and the second intensity-modulated optical input signal Sin2.

The optical phase of the second intensity-modulated optical input signal Sin2 is phase-shifted by optical phase shifter 120. The optical phase difference between signals Sin1 and Sin2 decides about the intensity distribution of the optical output signals So1-So4 as shown in FIG. 2. In FIG. 2, the intensity of the optical output signals So1-So4, which corresponds to the intensity of the electrical output signals I1-I4 of the photodetectors P1-P4, is plotted versus the phase difference φ of the optical phase shifter 120. Thus, by changing the phase difference φ, the optical intensity may be directed to a particular optical output 30A1-30A4 of the 90° optical hybrid unit 30.

For instance, if the phase difference φ is 180°, the intensity of the optical output signal So1 reaches its maximum and the intensity of the optical output signal So2 reaches its minimum. This allows characterizing the amplitude and/or phase response of the optical device 10 with respect to the first optical output 30A1 by evaluating the output signal of the transimpedance amplifier Tr1.

If the phase difference φ is switched to 0°, the intensity of the optical output signal So2 reaches its maximum and the intensity of the optical output signal So1 reaches its minimum. Now, the amplitude and/or phase response of the optical device 10 may be evaluated with respect to the second optical output by evaluating the output signal of the transimpedance amplifier Tr1.

It is apparent that changing the phase difference φ allows characterizing the amplitude and/or phase response of the optical device either with respect to the first optical output or with respect to the second optical output, based on the output signal of transimpedance amplifier Tr1.

In order to determine an amplitude and/or phase response of the optical device at a particular amplitude (intensity) modulation frequency, the central unit 170 controls the intensity modulator 112 to intensity-modulate (i.e. amplitude-modulate) the reference signal Iref with said particular amplitude modulation frequency. The amplitude modulation frequency preferably ranges between 10 MHz and 100 GHz and is thus smaller than the optical frequency of the optical reference signal Iref.

Then, the phase difference φ of the optical phase shifter 120 is set to approximately 0° or to approximately 180° and further regulated by the operational amplifier 150. The operational amplifier 150 regulates the optical phase difference φ such that the low-pass filtered signals I3' and I4' reach the same amplitude. As apparent from FIG. 2, the low-pass filtered signals I3' and I4' will reach equal amplitudes of 0.5 at the same time when the optical output signal So1 or the optical output signal So2 reach the maximum amplitude of 1.0.

The phase regulation provided by operational amplifier 150 based on the low-pass filtered signals I3' and I4' makes sure that any unintentional phase shift in the optical path inside and outside the optical device 10 does not influence the evaluation of the amplitude and/or phase response of the optical device at the amplitude modulation frequency. For instance, temperature changes or mechanical influences may change the optical transmission between the signal source 110 and the optical device 10 and the optical transmission inside the optical device 10 and thus the optical intensities at the optical outputs 30A1-30A4. Temperature changes or mechanical influences are usually very slow and do not exceed the cut-off frequency (preferably between 100 Hz and 10 kHz) of the low-pass filters 140. Therefore, signal changes at the optical outputs 30A3 and 30A4 based on these influences will reach the operational amplifier 150 which counteracts. The operational amplifier 150 regulates the optical phase shifter 120 such that the low-pass filtered signals I3' and I4' maintain their constant amplitude of 0.5. As such the intensity at the optical outputs 30A1 and 30A2 may be measured and evaluated as mentioned above.

In order to evaluate the amplitude and/or phase response of the optical device 10 at a particular amplitude modulation frequency, the central unit 170 controls the intensity modulator 112 to intensity-modulate (i.e. amplitude-modulate) the reference signal Iref.

Then, the central unit 170 may determine a ratio between the amplitude of the electrical output signal of the first transimpedance amplifier Tr1 and the amplitude of the intensity-modulation of the optical reference signal Iref', or a signal proportional thereto, for the intensity-modulation frequency. The ratio characterizes the amplitude response of the optical device for the intensity-modulation frequency with respect to the first optical output 30A1.

Alternatively or additionally, the central unit 170 may determine a phase difference value, which indicates the phase difference between the phase of the electrical output signal of the first transimpedance amplifier Tr1 and the phase of the intensity-modulation of the optical reference signal Iref', or a signal proportional thereto, for the intensity-modulation frequency. The phase difference value characterizes the phase shift of the optical device 10 for the intensity-modulation frequency with respect to the first optical output 30A1.

After determining the ratio and/or the phase difference value with respect to the first optical output 30A1, the input signals of the operational amplifier 150 may be swapped. This allows determining a second ratio between the amplitude of the electrical output signal of the first transimpedance amplifier Tr1 and the amplitude of the intensity-modulation of the optical reference signal, or a signal proportional thereto, for the intensity-modulation frequency. The second ratio characterizes the amplitude response of the optical device 10 for the intensity-modulation frequency with respect to the second optical output 30A2.

Alternatively or additionally, it is possible to determine a second phase difference value between the phase of the electrical output signal of the first transimpedance amplifier Tr1 and the phase of the intensity-modulation of the optical reference signal, or a signal proportional thereto, for the intensity-modulation frequency. The second phase difference value characterizes the phase shift of the optical device 10 for the intensity-modulation frequency with respect to the second optical output 30A2.

In FIG. 1 the evaluation device 20 is used to characterize the optical device 10 with respect to the optical outputs 30A1. Furthermore, the optical output 30A2 may be characterized if the connections of the photodiode P3 and P4 to the control unit 130 are swapped. In the same fashion, the optical outputs 30A3 and 30A4 may be characterized if the measurement unit 160 of the evaluation device 20 is connected to transimpedance amplifier Tr2 and if the control unit 130 is connected to photodetectors P1 and P2. The control unit 130 is used again to filter (or suppress) disturbing low-frequency phase shifts such as those generated by thermal or mechanical effects.

REFERENCE SIGNS 10 optical device
20 evaluation device
30 90° optical hybrid unit
30E1-30E2 optical input
30A1-30A4 optical output
110 signal source
111 laser
112 intensity modulator
113 3 dB-splitter
120 optical phase shifter
130 control unit 140 low-pass filter
150 operational amplifier
160 measurement unit
170 central unit
I1-I4 electrical output signal
I3', I4' low-pass filtered signal
P1-P4 photodetector
Sin1, Sin2 optical input signal
So1-So4 optical output signal
Tr1, Tr2 transimpedance amplifier
φ optical phase difference

The invention claimed is:

1. Method for characterizing an optical device (10), which comprises:
 a 90° optical hybrid unit having a first and a second optical input and at least two optical outputs wherein optical output signals leaving the optical outputs have optical phase differences between each other of 90° or multiple thereof;
 a first photodetector connected to a first optical output and a second photodetector connected to a second optical output, wherein the first optical output emits a first optical output signal and the second optical output emits a second optical output signal, said second optical output signal having an optical phase difference of 180° relative to the first optical output signal; and
 a first transimpedance amplifier connected to the first and second optical outputs of the 90° optical hybrid unit;
characterized in that
 a first intensity-modulated optical input signal and a second intensity-modulated optical input signal are generated;
 the first intensity-modulated optical input signal is inputted into the first optical input and the second intensity-modulated optical input signal is inputted into the second optical input;
 the optical phase of the second intensity-modulated optical input signal is phase-shifted relative to the first intensity-modulated optical input signal; and
 characterizing the optical device using the electrical output signal of the first transimpedance amplifier,
 wherein the optical device comprises a third photodetector connected to a third optical output of the 90° optical hybrid unit, and a fourth photodetector connected to a fourth optical output of the 90° optical hybrid unit, the third optical output emitting a third optical output signal and the fourth optical output emitting a fourth optical output signal, said fourth optical output signal having an optical phase difference of 180° relative to the third optical output signal;
 wherein the electrical output signals of the third and fourth photodetector are low-pass filtered and the low-pass filtered signals are inputted into an operational amplifier, and
 the output signal of the operational amplifier is used to control an optical phase shifter which controls the optical phase-difference between the first and second intensity-modulated optical input signals in order to provide that the low-pass filtered signals have the same amplitude.

2. Method for characterizing an optical device, which comprises:
 a 90° optical hybrid unit having a first and a second optical input and at least two optical outputs wherein optical output signals leaving the optical outputs have optical phase differences between each other of 90° or multiple thereof;
 a first photodetector connected to a first optical output and a second photodetector connected to a second optical output, wherein the first optical output emits a first optical output signal and the second optical output emits a second optical output signal, said second optical output signal having an optical phase difference of 180° relative to the first optical output signal; and
 a first transimpedance amplifier connected to the first and second optical outputs of the 90° optical hybrid unit;
wherein
 a first intensity-modulated optical input signal and a second intensity-modulated optical input signal are generated;
 the first intensity-modulated optical input signal is inputted into the first optical input and the second intensity-modulated optical input signal is inputted into the second optical input;
 the optical phase of the second intensity-modulated optical input signal is phase-shifted relative to the first intensity-modulated optical input signal; and
 characterizing the optical device using the electrical output signal of the first transimpedance amplifier;
 wherein an optical reference signal (Iref) is intensity-modulated at an intensity-modulation frequency; and
 the intensity-modulated optical reference signal (Iref') is inputted into a 3 dB-splitter which emits the first and second intensity-modulated optical input signals for the 90° optical hybrid unit,
 wherein the intensity-modulation frequency is higher than a bandwidth of the low-pass filtered signals and lower than an optical frequency of the optical reference signal.

3. Method for characterizing an optical device, which comprises:
 a 90° optical hybrid unit having a first and a second optical input and at least two optical outputs wherein optical output signals leaving the optical outputs have optical phase differences between each other of 90° or multiple thereof;
 a first photodetector connected to a first optical output and a second photodetector connected to a second optical output, wherein the first optical output emits a first optical output signal and the second optical output emits a second optical output signal, said second optical output signal having an optical phase difference of 180° relative to the first optical output signal; and
 a first transimpedance amplifier connected to the first and second optical outputs of the 90° optical hybrid unit;
wherein
 a first intensity-modulated optical input signal and a second intensity-modulated optical input signal are generated;
 the first intensity-modulated optical input signal is inputted into the first optical input and the second intensity-modulated optical input signal is inputted into the second optical input;
 the optical phase of the second intensity-modulated optical input signal is phase-shifted relative to the first intensity-modulated optical input signal;
 characterizing the optical device using the electrical output signal of the first transimpedance amplifier;
 wherein an optical reference signal (Iref) is intensity-modulated at an intensity-modulation frequency; and
 the intensity-modulated optical reference signal (Iref') is inputted into a 3 dB-splitter which emits the first and second intensity-modulated optical input signals for the 90° optical hybrid unit, wherein a ratio between the amplitude of the electrical output signal of the first transimpedance amplifier and the amplitude of the intensity-modulation of the optical reference signal, or a signal proportional thereto, is determined for the intensity-modulation frequency, said ratio characterizing the amplitude response of the optical device for the intensity-modulation frequency with respect to the first optical output, wherein after determining said ratio, the optical phase difference between the first and second intensity-modulated optical input signals is changed by 180° and is then further controlled such that the low-pass filtered signals have the same amplitude; and a second ratio between the amplitude of the electrical output signal of the first transimpedance amplifier and the amplitude of the intensity-modulated optical reference signal, or a signal proportional thereto, is determined for the intensity-modulation frequency, said second ratio characterizing the amplitude response of the optical device for the intensity-modulation frequency with respect to the second optical output.

4. Method for characterizing an optical device, which comprises:

a 90° optical hybrid unit having a first and a second optical input and at least two optical outputs wherein optical output signals leaving the optical outputs have optical phase differences between each other of 90° or multiple thereof;

a first photodetector connected to a first optical output and a second photodetector connected to a second optical output, wherein the first optical output emits a first optical output signal and the second optical output emits a second optical output signal, said second optical output signal having an optical phase difference of 180° relative to the first optical output signal; and a first transimpedance amplifier connected to the first and second optical outputs of the 90° optical hybrid unit;

wherein a first intensity-modulated optical input signal and a second intensity-modulated optical input signal are generated;

the first intensity-modulated optical input signal is inputted into the first optical input and the second intensity-modulated optical in is inputted into the second optical input;

the optical phase of the second intensity-modulated optical input signal is phase-shifted relative to the first intensity-modulated optical input signal;

characterizing the optical device using the electrical output signal of the first transimpedance amplifier;

wherein an optical reference signal (Iref) is intensity-modulated at an intensity-modulation frequency; and the intensity-modulated optical reference signal (Iref) is inputted into a 3 dB-splitter which emits the first and second intensity-modulated optical input signals for the 90° optical hybrid unit, wherein a phase difference value, which indicates the phase difference between the phase of the electrical output signal of the first transimpedance amplifier and the phase of the intensity-modulation of the optical reference signal, or a signal proportional thereto, is determined for the intensity-modulation frequency, said phase difference value characterizing the phase shift of the optical device for the intensity-modulation frequency with respect to the first optical output, wherein after determining said phase difference value, the phase shift between the first and second input signal is changed by 180° and is then further controlled such that the low-pass filtered signals have the same amplitude; and a second phase difference value between the phase of the electrical output signal of the first transimpedance amplifier and the phase of the intensity-modulated optical reference signal, or a signal proportional thereto, is determined for the intensity-modulation frequency, said second phase difference value characterizing the phase shift of the optical device for the intensity-modulation frequency with respect to the second optical output.

5. System comprising an optical device and an evaluation device for characterizing the optical device, said optical device comprising:

a 90° optical hybrid unit having a first and second optical input and at least two optical outputs wherein optical output signals leaving the optical outputs have optical phase differences between each other of 90° or multiple thereof;

a first photodetector connected to a first optical output and a second photodetector connected to a second optical output, wherein the first optical output emits a first optical output signal and the second optical output emits a second optical output signal, said second optical output signal having an optical phase difference of 180° relative to the first optical output signal; and a first transimpedance amplifier connected to the first and second photodetectors;

wherein the evaluation device is characterized by a signal source configured to generate a first and second intensity-modulated optical input signal;

an optical phase shifter adapted to phase-shift the optical phase of the second intensity-modulated optical input signal relative to the optical phase of the first intensity-modulated optical input signal;

a measurement unit adapted to measure the electrical output signal of the first transimpedance amplifier; and a control unit adapted to control the optical phase shifter, wherein the optical device further comprises a third photodetector connected to a third optical output of the 90° optical hybrid unit, and a fourth photodetector connected to a fourth optical output of the 90° optical hybrid unit, the third optical output emitting a third optical output signal and the fourth output emitting a fourth optical output signal, said fourth optical output signal having an optical phase difference of 180° relative to the third optical output signal; and wherein the control unit comprises low-pass filters adapted to low-pass filter the electrical output signals of the third and fourth photodetectors and to provide low-pass filtered signals, and wherein the control unit further comprises an operational amplifier to which said low-pass filtered signals are coupled, said operational amplifier being adapted to control the optical phase of the optical phase shifter in order to provide that said low-pass filtered signals have the same amplitude.

* * * * *